(12) United States Patent
Baumann

(10) Patent No.: US 7,701,653 B2
(45) Date of Patent: Apr. 20, 2010

(54) PRISMATIC JOINT AND OPTICAL SWIVELING DEVICE

(75) Inventor: Rainer Baumann, Überlingen (DE)

(73) Assignee: Diehl BGT Defence GmbH & Co. KG, Ueberlingen/BRD (DE)

( * ) Notice: Subject to any disclaimer, the term of this patent is extended or adjusted under 35 U.S.C. 154(b) by 0 days.

(21) Appl. No.: 12/169,001

(22) Filed: Jul. 8, 2008

(65) Prior Publication Data

US 2009/0040634 A1    Feb. 12, 2009

(30) Foreign Application Priority Data

Jul. 28, 2007   (DE) .................. 10 2007 035 574

(51) Int. Cl.
   *G02B 5/04*    (2006.01)
(52) U.S. Cl. .................. 359/834; 359/837; 359/831
(58) Field of Classification Search ................ 359/831, 359/834, 837
   See application file for complete search history.

(56) References Cited

U.S. PATENT DOCUMENTS

| | | | | |
|---|---|---|---|---|
| 1,994,531 A * | 3/1935 | Hoyt | .......................... | 359/640 |
| 2,147,615 A * | 2/1939 | Augusto | ..................... | 359/834 |
| 2,317,988 A * | 5/1943 | Forssberg | ................... | 359/834 |
| 2,406,798 A * | 9/1946 | Burroughs | .................. | 342/429 |
| 2,767,629 A * | 10/1956 | Millet | ......................... | 396/327 |
| 2,792,751 A * | 5/1957 | Coleman | .................... | 359/669 |
| 3,235,733 A * | 2/1966 | Dauguet | ................... | 250/203.1 |
| 4,061,415 A | 12/1977 | Taenzer | | |
| 4,087,061 A | 5/1978 | Burt | | |
| 4,404,592 A * | 9/1983 | Pepin et al. | .................. | 348/169 |
| 4,850,686 A * | 7/1989 | Morimoto et al. | ........ | 359/196.1 |
| 6,094,210 A * | 7/2000 | Cobb et al. | ................... | 347/256 |
| 6,779,753 B2 * | 8/2004 | Baumann et al. | ........... | 244/3.16 |
| 7,236,299 B1 | 6/2007 | Smith | | |
| 7,564,478 B2 * | 7/2009 | Baumann et al. | ............ | 348/146 |
| 2005/0200965 A1 | 9/2005 | Staley, III et al. | | |
| 2006/0243853 A1 | 11/2006 | Baumann | | |

FOREIGN PATENT DOCUMENTS

DE   10135222 A1   2/2003
EP    1586195 B1  10/2005

* cited by examiner

*Primary Examiner*—Ricky D Shafer
(74) *Attorney, Agent, or Firm*—Laurence A. Greenberg; Werner H. Stemer; Ralph E. Locher

(57) ABSTRACT

A prismatic joint for an optical swiveling device has a first prism rotatably mounted about a first rotation axis and a second prism, rotatably mounted about a second rotation axis with respect to the first prism. The first rotation axis and the second rotation axis intersect one another at an intersection angle of 45°. The first prism and the second prism have a respective first side surface and a second side surface, as well as a base surface. The first side surface is inclined through the intersection angle with respect to the base surface, and the second side surface is inclined through half the intersection angle with respect to the base surface. The first and second prisms project substantially mirror-image symmetrically along the first rotation axis, and a third prism is disposed with its side surfaces adjoining, the first and the second prisms.

10 Claims, 3 Drawing Sheets

PRISMATIC JOINT AND OPTICAL SWIVELING DEVICE

CROSS-REFERENCE TO RELATED APPLICATION

This application claims the priority, under 35 U.S.C. §119, of German application DE 10 2007 035 574.4, filed Jul. 28, 2007; the prior application is herewith incorporated by reference in its entirety.

BACKGROUND OF THE INVENTION

Field of the Invention

The invention relates to a prismatic joint having a number of prisms which are arranged such that they can rotate with respect to one another, for an optical swiveling device. In particular, the aim of the prismatic joint is to allow the optical path of a recording and projection appliance to be positioned within a large solid angle range, such that a comparatively small part of the solid angle range can be recorded, and projection is made possible within this small part.

A prismatic joint or prism joint such as this can be used for a very wide range of purposes in optical swiveling devices. For example, the prismatic joint can be used in a swiveling device in order to create architectural records, for example of the interiors of churches or the like, or for cartographic recording of large areas by laser range finding, as well as in a swiveling device for projection of records or films into specific solid angle areas. The prismatic joint can also be used in a swiveling device which is used as a monitoring or search device or, conversely, is also suitable for use as a 3D target simulator with a high-resolution target projection display. In particular, the prismatic joint is suitable for an optical swiveling device for target acquisition in a homing head of a guided missile.

Commonly assigned European patent EP 1 586 195 B1 (cf. U.S. patent publication US 2006/0243853 A1) discloses a prismatic joint for an optical swiveling device in a homing head of a guided missile, in which the prismatic joint comprises a number of first prisms which can rotate about a roll axis, and a number of second prisms which can rotate about a pitch axis with respect to the roll axis. The pitch axis and the roll axis in this case intersect at an angle of 90°. The first and second prisms can in this case each also be combined to form a single prism. The described prismatic joint comprises a total of four individual prisms which have side surfaces that are inclined at an angle of 45° to a base surface and of the same length. In one embodiment variant that is also disclosed, three of these prisms can in each case be combined to form one integral prism. A beam passing through the prismatic joint is deflected a total of four times by means of 90° total internal reflection on the inner faces of the side surfaces of the prisms, so that the optical image is independent of any rotation with respect to the roll axis and with respect to the pitch axis.

SUMMARY OF THE INVENTION

The object of the invention is to specify a prismatic joint of the type mentioned initially which allows the positioning of the optical path in a comparatively small part of a large solid angle range that can be observed, with a detection/transmission unit that is fixed to the structure, and which is further improved over the prior art.

With the above and other objects in view there is provided, in accordance with the invention, a prismatic joint for an optical swiveling device, comprising:

a first prism rotatably mounted about a first rotation axis;
a second prism rotatably mounted about a second rotation axis relative to the first prism;
the first rotation axis and the second rotation axis intersecting at an intersection angle of 45°;
the first prism and the second prism each having a first side surface, a second side surface, and a base surface;
the first side surface of each of the first and second prisms being inclined with respect to the base surface by the intersection angle, and the second side surface of each of the first and second prisms being inclined through half the intersection angle with respect to the base surface;
a third prism having a base surface and side surfaces inclined symmetrically at the intersection angle with respect to the base surface; and
the first and second prisms projecting substantially mirror-image symmetrically along the first rotation axis, and the third prism being arranged between the first and second prisms, in each case with the side surfaces adjoining the first and second prisms, respectively.

In other words, the objects of the invention are achieved by a prismatic joint for an optical swiveling device, having a first prism which is mounted such that it can rotate about a first rotation axis, and having a second prism, which is mounted such that it rotate about a second rotation axis with respect to the first prism, with the first rotation axis and the second rotation axis intersecting at an intersection angle of 45°, with the first prism and the second prism having a respective first side surface and a second side surface, as well as a base surface, with the first side surface being inclined through the intersection angle with respect to the base surface, and with the second side surface being inclined through half the intersection angle with respect to the base surface, and having a third prism which has side surfaces which are inclined symmetrically at the intersection angle with respect to a base surface, with the first and the second prisms projecting essentially mirror-image symmetrically along the first rotation axis, and with the third prism being arranged, in each case with its side surfaces adjacent, between the first and the second prisms.

The invention in this case based on the discovery that a prismatic joint for predetermined alignment of an optical path by rotation about a first axis and by rotation about a second axis, with the axes intersecting at an angle of 90°, is subject to unnecessary movement restrictions. Furthermore, the 45° prisms which are required to form a corresponding prismatic joint occupy a relatively large amount of space.

The invention is then also based on the consideration that, if the intersection angle between the first and the second rotation axis is 45°, this makes it considerably easier to reach certain positions in the optical path. Particularly in the case of a refinement such as this, complete rotation of the second prism about the second rotation axis, which is inclined at 45° to the first rotation axis, can be carried out with a simple design. Furthermore, the physical volume of the prisms which are required for the prismatic joint is less than that of a 90° arrangement, so that this makes it possible to achieve a compact form overall. In addition, the optical path through the prismatic joint can be reduced because the prisms that are required are flatter, therefore reducing imaging errors.

In the stated arrangement and refinement of the prisms, an imaging beam on the object side first of all enters the second prism, and is totally internally reflected twice on its inner faces. Because of the given geometric relationships, the beam now leaves the second prism at right angles to one side surface, and enters the third prism. 90° total internal reflection takes place on its base surface, so that the beam emerges at right angles through the opposite side surface of the third prism and now enters the first prism. The beam is once again totally internally reflected twice on the inner faces of the first prism, so that it finally leaves the first prism in the direction along the first rotation axis.

Passage through the prismatic joint therefore results in total internal reflection occurring a total of five times, with the beam path running symmetrically with respect to the third prism. Overall, the flatter prisms result in a reduced physical volume and a reduced optical path length through the prisms in comparison to a 90° arrangement according to the prior art. Furthermore, this results in a reduced color error and a reduced temperature-dependent focus shift, and less sensitivity to scatter light as well.

The individual prisms of the stated prismatic joint may be formed integrally. In this case, the third, central prism can either be associated with the first or the second prism such that it can either be rotated with the first prism about the first rotation axis or with the second prism about the second rotation axis. In one further advantageous variant, the respectively mutually associated prisms, that is to say either the first prism and the third prism or the second prism and the third prism, are not in the form of separate prisms, but are formed by an integral prism. This simplifies handling during fitting and adjustment of the prismatic joint in this case. This also reduces the production costs.

In a further advantageous refinement of the invention, the third prism is designed such that it can rotate with respect to the first prism, and the second prism is designed such that it can rotate with respect to the third prism, thus resulting in a third rotation axis which intersects the second rotation axis at an angle of 45°, that is to say the intersection angle. On the basis of the simpler variant of the prismatic joint with two rotation axes, with the second prism rotating with the associated third prism about the second rotation axis with respect to the first prism, a new degree of freedom is created, since the second prism can now rotate with respect to the third prism about the third rotation axis. Against the notional background of a simple arrangement, in which the second prism can rotate about the second rotation axis with respect to the first and the associated third prisms, this refinement introduces a new degree of freedom such that the third prism can now additionally rotate about the third rotation axis with respect to the first prism.

Overall, the embodiment of the prismatic joint such that it can rotate about three rotation axes results in an arrangement which allows rotation about two further rotation axes in addition to rotation about the first rotation axis, with these two further axes being at right angles to one another. In particular, the rotation axes are in this case not coupled to one another. Furthermore, no so-called one-axis singularity occurs. This refinement is made possible by the symmetrical configuration of the prismatic joint. This refinement allows rapid movement to a desired position on the optical path from a predetermined position.

With respect to the imaging errors, it is advantageous for the first and the second prisms to be identical. This may also reduce the production costs, if identical prisms can be used for the first and the second prisms.

In a first further preferred embodiment of the prismatic joint, the first and the second prism are aligned with their base surfaces facing one another. This embodiment results in a flat and compact design overall along the first rotation axis, with the base surfaces of the two prisms being aligned at an angle of 90° to one another in this case because of the given geometric relationships. A frame structure to form the bearing which can rotate can therefore be designed to be particularly simple. This variant also offers the further advantage that, with the corresponding capability to rotate about three axes, all three rotation axes intersect at a common center point. Overall, a transparent dome can be provided which may cover the optical swiveling device and the prismatic joint located in it, and whose center point is located at the stated intersection point.

In another design refinement of the prismatic joint, the first and the second prism are aligned with their side surfaces facing one another. This refinement results in a design which is physically more extended with respect to the first rotation axis since, because of the geometric relationships, the first and the second prisms are now aligned with their base surfaces at right angles to one another, and in particular at right angles to the first rotation axis. The provision of a capability to rotate about three axes also results in certain design disadvantages, since the rotation axes do not all intersect at a common intersection point. Nevertheless, because of its symmetrical configuration, this variant offers considerable advantages over the known prismatic joints from the prior art and in this case results in particular in a reduced optical path length and reduced imaging errors.

For cost and design reasons, the third prism is expediently designed such that it has a cross section in the form of an isosceles triangle.

For further improvement, the surfaces of the prisms through which the light passes can additionally be designed to influence the image, in particular in order to widen or to focus the beam cross section. Further imaging optics can also be added to the prismatic joint, in particular producing a real intermediate image between the object side and the detection/transmission unit. If the real intermediate image is produced in the vicinity of or within the prismatic joint, the size of the prisms can be further reduced, since the beam cross section is reduced in the vicinity of the real intermediate image. In this case, appropriate imaging optics must be provided in order to image the intermediate image on the detection/transmission unit.

With the above and other objects in view there is also provided, in accordance with the invention, an optical swiveling device for imaging and/or projecting an object scene. The device comprises:

a supporting structure and a detection/transmission unit disposed in the supporting structure;

a first frame rotatably mounted with respect to the supporting structure about a first rotation axis, and a second frame rotatably mounted about a second rotation axis with respect to the first frame, the first rotation axis and the second rotation axis intersecting at an intersection angle of 45°; and a prismatic joint as outlined above disposed for optical connection between the first frame and the second frame.

In other words, an optical swiveling device is advantageously also provided for imaging and/or projection of an object scene, which comprises a supporting structure, a detection/transmission unit arranged in the supporting structure, a first frame which can rotate about a first rotation axis with respect to the supporting structure, and a second frame which can rotate about a second rotation axis with respect to the first frame, with the first rotation axis and the second rotation axis intersecting at an intersection angle of 45° when an above-mentioned prismatic joint is arranged to produce an optical connection between the first and the second frame.

In the preferred refinement, the first frame is in this case associated with the first prism and the second frame is associated with the third prism, with a third frame being provided which can rotate about a third rotation axis with respect to the second frame, and is associated with the second prism. The advantages which have been mentioned with respect to the prismatic joint and in this case in particular with respect to the capability to rotate about three axes can be transferred analogously in this case.

Other features which are considered as characteristic for the invention are set forth in the appended claims.

Although the invention is illustrated and described herein as embodied in prismatic joint, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
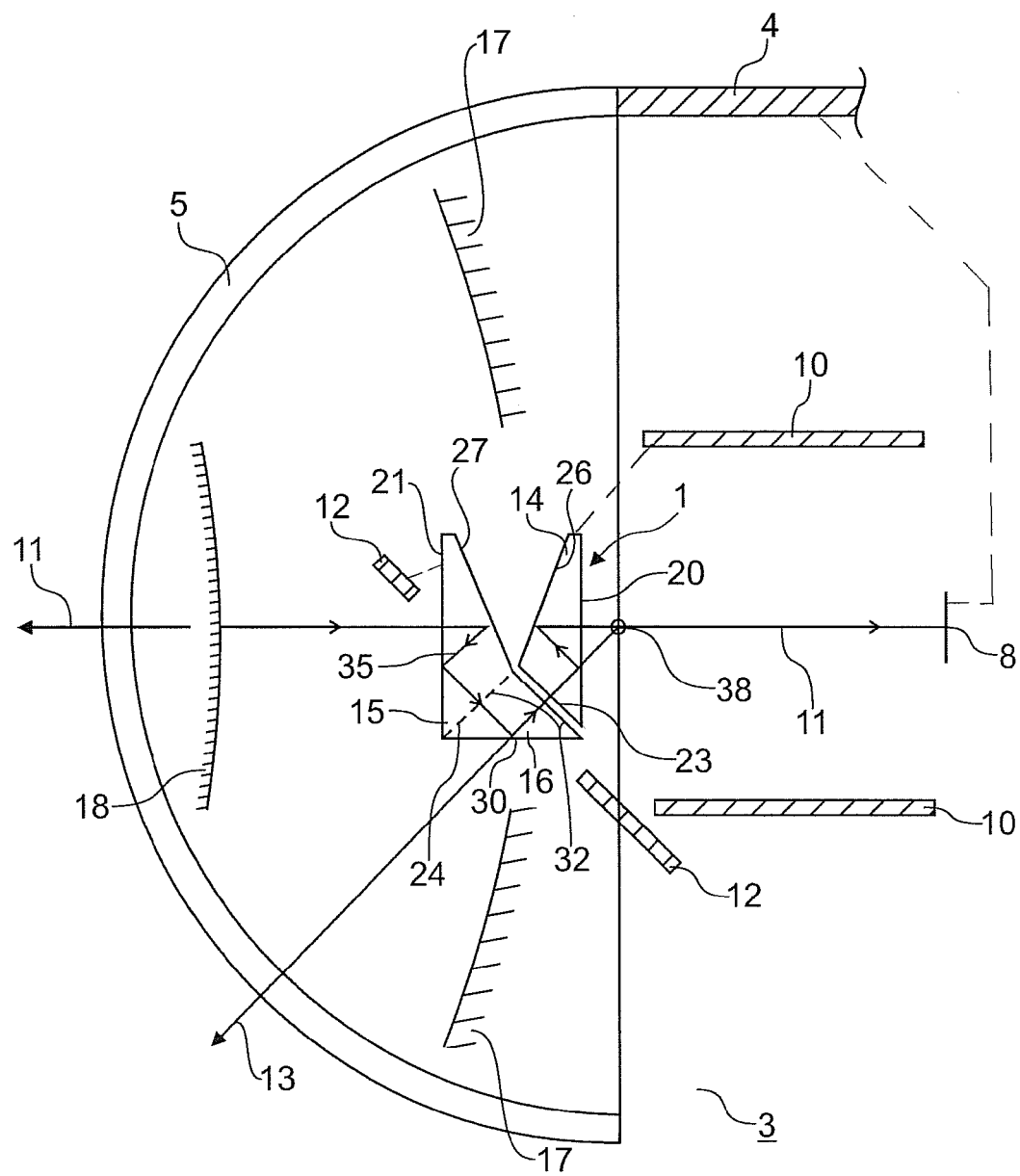
FIG. 1 shows a first embodiment of a prismatic joint arranged in an optical swiveling device.

Referring now to the figures of the drawing in detail and first, particularly, to FIG. 1 thereof, there is shown, schematically and in section, an apparatus according to the invention, namely, a first prismatic joint 1 disposed in the optical path of an optical swiveling device 3. The optical swiveling device 3 in this case comprises a supporting structure 4, on which a transparent dome 5 rests. A detector 8 for detection of sections of an object scene is arranged fixed to the structure within the optical swiveling device 3.

The optical swiveling device 3 furthermore comprises a first frame 10, which is mounted such that it can rotate about a first rotation axis 11 with respect to the supporting structure 4. A second frame 12 is mounted such that it can rotate about a second rotation axis 13 with respect to the first frame 10. The first rotation axis 11 and the second rotation axis 13 in this case intersect at an intersection angle of 45°. In the case of an airborne vehicle, the first rotation axis 11 is usually referred to as the roll axis, and the second rotation axis 13 as the pitch axis.

A first prism 14 is arranged fixed on the first frame 10 as a component of the prismatic joint 1. The second prism 15 and the third prism 16, which in this case are combined as an integral element, are attached to the second frame 12 such that they can rotate with respect to the first prism 14. Cassegrian optics for imaging a field of view onto the detector 8 are also arranged on the second frame 12. The Cassegrian optics comprise a concave-parabolic main mirror 17 with a central recess in which the prismatic joint 1 is arranged, and a convex-hyperbolic catchment mirror 18, which aligns incoming beams in the direction of the central recess, and therefore in the direction of the prismatic joint 1, and may focus them to form a real intermediate image.

The first and the second prism 14 and 15, respectively, have respective base surfaces 20 and 21 as well as first respective side surfaces 23 and 24 and second respective side surfaces 26 and 27. The first side surfaces 23 and 24 are in this case inclined at an angle of 45° to the respective base 20 or 21. The second side surfaces 26 and 27 are inclined at an angle of 22.5° with respect to the base surface 20 or 21, respectively, that is to say at half the intersection angle between the first rotation axis 11 and the second rotation axis.

The third prism 16 has a base surface 30, with respect to which its side surfaces 32 are each inclined symmetrically at an angle of 45°. In this case, one of its side surfaces 32 coincides with the first side surface 23 of the second prism 15, although this does not occur in reality in the integral embodiment.

An imaging beam which enters through the base surface 21 of the second prism 15 is first of all totally internally reflected on the second side surface 27 of the second prism 15 at 45°. As can be seen from the illustrated imaging beam path 35, the incident beam is in consequence once again reflected back towards the base surface 21, where it is now totally internally reflected through 90°. Finally, the beam propagates into the third prism 16, where it is once again reflected through 90° on its base surface 30. Finally, the beam emerges from the side surface 32 of the third prism 16, passes through the coupling point and enters the first prism 14 via the first side surface 23. Once again, it is reflected through 90° on its base surface 20 and is deflected towards the second side surface 26 of the first prism 14 where it is totally internally reflected through 45° and is finally deflected along the first rotation axis 11, so that it emerges without any losses from the base surface 20 of the first prism 15.

Conversely, the illustrated prismatic joint 1 results in a beam which originates from the detector 8 and emerges along the first rotation axis 11 being deflected on the object side in a direction which is inclined at the intersection angle, that is to say at an angle of 45°, to the second rotation axis 13. Both the elevation angle and the azimuth angle of this object-side direction are in this case influenced by rotation of the second frame 12 about the second rotation axis 13.

As can also be seen, the first rotation axis 11 and the second rotation axis 13 intersect at a center point 38, which is also the center point for the spherical dome 5.

FIG. 2 once again shows a schematic section through a second prismatic arrangement 1', which is arranged in the optical path of the swiveling device 3 shown in FIG. 1. The second prismatic arrangement 1' illustrated in FIG. 2 differs from the first prismatic arrangement illustrated in FIG. 1 in that the second prism 15 and the third prism 16 are now formed separately from one another, as separate prisms. In addition, the second prism 15 is associated with a third frame 40 which is mounted such that it can rotate about a third rotation axis 42 with respect to the second frame 12, as can be seen in FIG. 1. The first frame 10 and the second frame 12 are no longer also shown in FIG. 2.

This arrangement results in an additional degree of freedom. In particular, the second prism 15 and the third prism 16 can be rotated independently of one another about the third rotation axis 42 and about the second rotation axis 13, respectively. The third rotation axis 42 and the second rotation axis 13 in this case intersect at an angle of 90°.

A refinement such as this allows the optical path to be repositioned more quickly from a predetermined first position to a predetermined second position, in comparison to the prior art. Since the third rotation axis 42 and the second rotation axis 13 intersect at a point that does not coincide with the intersection point 38 of the second rotation axis 13 with the first rotation axis 11, this has certain design disadvantages in terms of the mechanical configuration.

Figure 2:
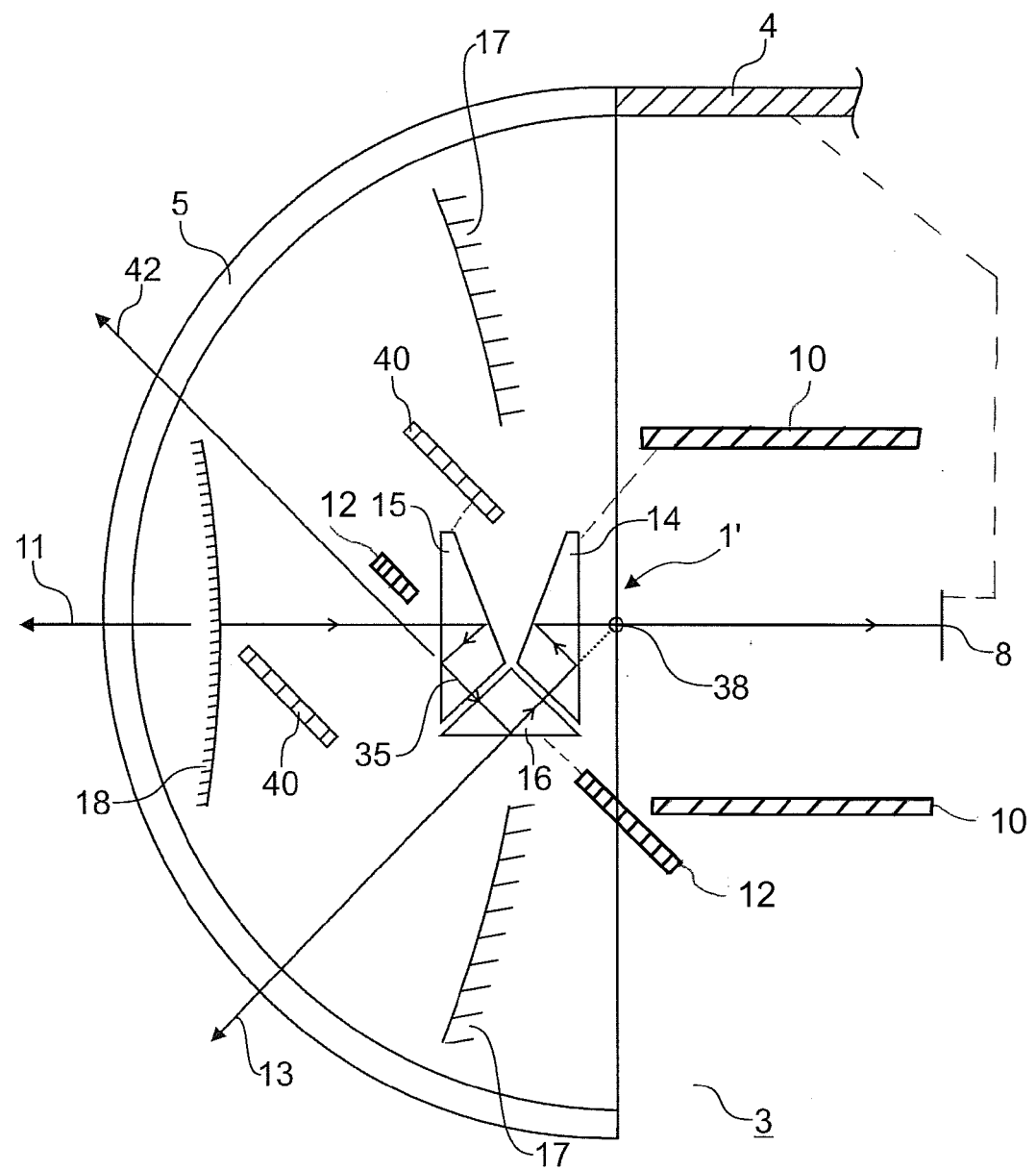
FIG. 2 shows a second embodiment of a prismatic joint arranged in optical swiveling device.
Figure 3:
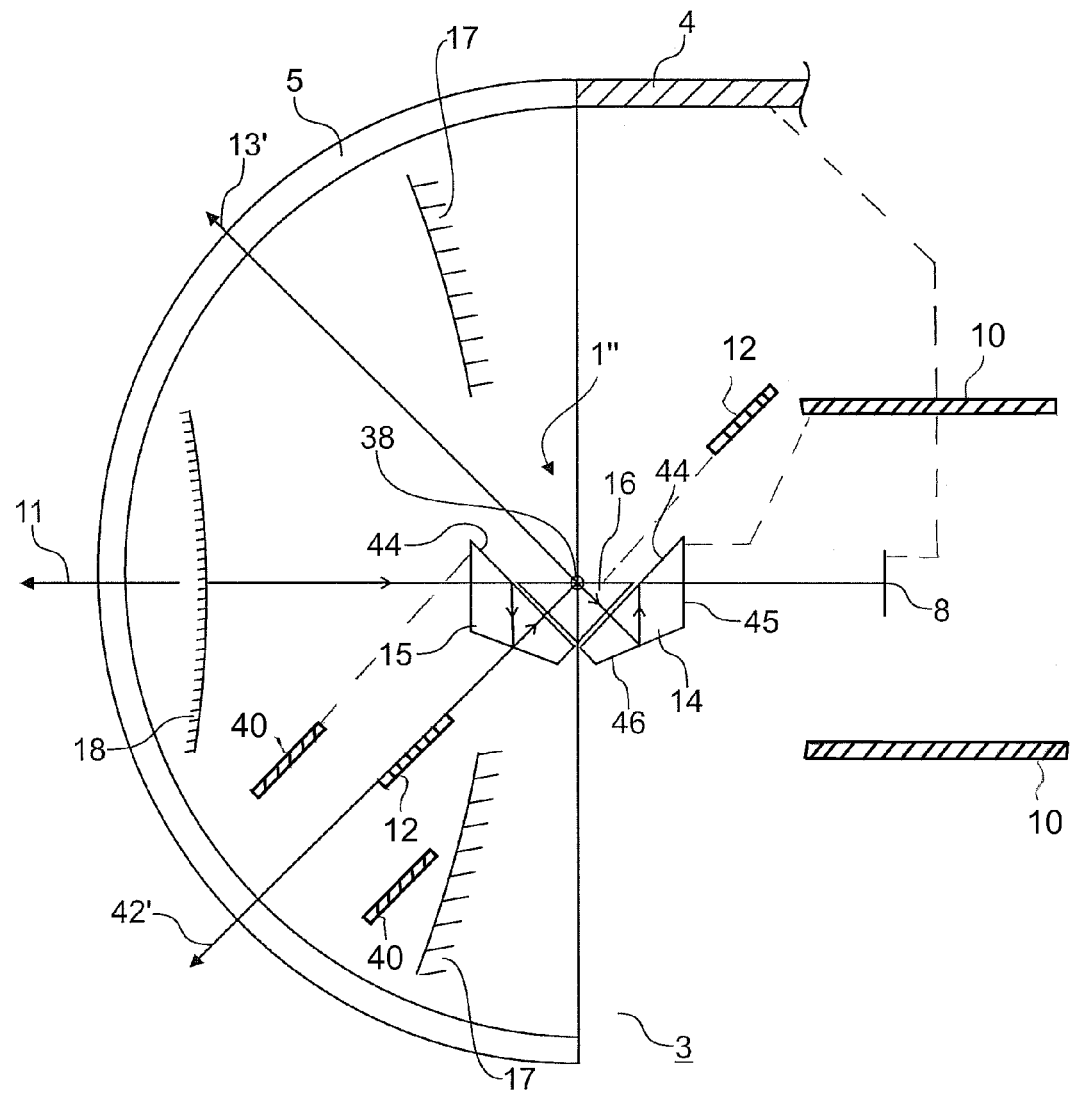
FIG. 3 shows a third embodiment of a prismatic joint arranged in an optical swiveling device.

These disadvantages can be avoided by a third prismatic joint 1", as is illustrated schematically in the form of a section view in FIG. 3. The third prismatic arrangement 1" is once again arranged in the optical path of an optical swiveling device 3, as is shown in FIG. 2. Once again, this shows the supporting structure 4 and the dome 5 resting on it, as well as the detector 8 which is fixed to the structure. The figure also shows the Cassegrian optics with the main mirror 17 and the catchment mirror 18.

The third prismatic arrangement 1" now comprises a first prism 14, a second prism 15 and a third prism 16, although the first prism 14 and the second prism 15 are now aligned with their base surfaces 44 facing one another. The third prism 16, which once again has side surfaces of equal length aligned at an angle of 45° to its base surface, is located between the base surfaces of the first and second prisms 14 and 15, respectively.

An incoming beam passes through the first side surface of the second prism 15 and is totally internally reflected through 90° on its base surface 44. A total internal reflection through 45° takes place on the second side surface, opposite the base surface, resulting in the beam being deflected into the third prism 16. There, it is totally internally reflected through 90° once again on its base surface 44, resulting in the beam being deflected into the first prism, and being totally internally reflected through 45° on its second side surface 46. After being totally internally reflected through 90° once again on the base surface 44 of the first prism 14, the beam emerges from a side surface 45 of the first prism 14 and is aligned towards the detector 8 along the first rotation axis 11.

As can be seen from FIG. 1, the first prism 14 is associated with the first frame 10. However, in contrast to FIG. 2, the third prism 16 is now arranged on a second frame, which is not shown but is mounted such that it can rotate with respect to the first frame about a second rotation axis 13'. Finally, the second prism 15 is mounted on a third frame, which is not shown but which is mounted so that it can rotate about a third rotation axis 42' with respect to the second frame.

As can be seen from FIG. 3, and in contrast to the arrangement of the prismatic joint 1" illustrated in FIG. 2, the second rotation axis 13' and the third rotation axis 42' intersect the first rotation axis 11 at a common intersection point 38. This allows a simple design configuration of the frame parts. In particular, it is possible to hermetically seal the prismatic joint 1" and the further moveable optical components together with the dome 5 with the supporting structure 4, with the dome 5 having a center point at the intersection point 38.

As can also be seen from FIG. 3, the third prismatic joint 1" has a reduced physical height transversely with respect to the first lateral axis 11. Overall, this therefore results in a more compact form.

The invention claimed is:

1. A prismatic joint for an optical swiveling device, comprising:
a first prism rotatably mounted about a first rotation axis;
a second prism rotatably mounted about a second rotation axis relative to said first prism;
said first rotation axis and said second rotation axis intersecting at an intersection angle of 45°;
said first prism and said second prism each having a first side surface, a second side surface, and a base surface;
said first side surface of each of said first and second prisms being inclined with respect to said base surface by said intersection angle, and said second side surface of each of said first and second prisms being inclined through half the intersection angle with respect to said base surface;
a third prism having a base surface and side surfaces inclined symmetrically at said intersection angle with respect to said base surface; and
said first and second prisms projecting substantially mirror-image symmetrically along said first rotation axis, and said third prism being arranged between said first and second prisms, in each case with said side surfaces adjoining said first and second prisms, respectively.

2. The prismatic joint according to claim 1, wherein said third prism is functionally associated with said first prism or with said second prism.

3. The prismatic joint according to claim 2, wherein said third prism is formed integrally in one piece with said first prism or with said second prism.

4. The prismatic joint according to claim 1, wherein said third prism is rotatably mounted with respect to said first prism and said second prism is rotatably mounted with respect to said third prism, resulting in a third rotation axis intersecting said second rotation axis at an angle of 45°.

5. The prismatic joint according to claim 1, wherein said first prism and said second prism are mutually identical.

6. The prismatic joint according to claim 1, wherein said first prism and said second prism are aligned with said base surfaces facing one another.

7. The prismatic joint according to claim 1, wherein said first prism and said second prism are aligned with said side surfaces facing one another.

8. The prismatic joint according to claim 1, wherein said third prism has a cross section forming an isosceles triangle.

9. An optical swiveling device for imaging or projecting an object scene, comprising:
a supporting structure;
a detection or transmission unit disposed in said supporting structure;
a first frame rotatably mounted with respect to said supporting structure about a first rotation axis;
a second frame rotatably mounted about a second rotation axis with respect to said first frame;
said first rotation axis and said second rotation axis intersecting at an intersection angle of 45; and
a prismatic joint according to claim 1 disposed for optical connection between said first frame and said second frame.

10. The swiveling device according to claim 9, wherein said first frame is associated with said first prism and said second frame is associated with said third prism, and wherein a third frame is rotatably mounted about a third rotation axis with respect to said second frame, and wherein said second prism is associated with said third frame.

* * * * *